(12) United States Patent
Schreier et al.

(10) Patent No.: US 6,366,367 B1
(45) Date of Patent: Apr. 2, 2002

(54) METHOD AND DEVICE FOR THE DIGITAL DETECTION OF TRANSPARENT AND OPAQUE DOCUMENTS

(75) Inventors: Hans-Hermann Schreier; Robert Masselink; Jürgen Valentin; Markus Grigat; Frank Plück; André Brück, all of Duisburg (DE)

(73) Assignee: DRS Digitale Repro-Systeme GmbH, Duisburg (DE)

( * ) Notice: Subject to any disclaimer, the term of this patent is extended or adjusted under 35 U.S.C. 154(b) by 0 days.

(21) Appl. No.: 09/254,380
(22) PCT Filed: Jul. 2, 1998
(86) PCT No.: PCT/DE98/01881
§ 371 Date: Mar. 5, 1999
§ 102(e) Date: Mar. 5, 1999
(87) PCT Pub. No.: WO99/03260
PCT Pub. Date: Jan. 21, 1999

(30) Foreign Application Priority Data

Jul. 8, 1997 (DE) .......................................... 197 29 142

(51) Int. Cl.⁷ ................................................ H04N 1/04
(52) U.S. Cl. ......................... 358/487; 358/474; 358/506
(58) Field of Search ................................. 358/474, 487, 358/506, 505, 468

(56) References Cited

U.S. PATENT DOCUMENTS

| 5,173,789 A | 12/1992 | Renner et al. ............... 358/475 |
| 5,218,463 A | 6/1993 | Lianza et al. ............... 358/487 |
| 5,293,475 A | 3/1994 | Hennigan et al. ........... 395/158 |

FOREIGN PATENT DOCUMENTS

| DE | 38 23 075 | 1/1990 | .......... H04N/1/393 |
| DE | 34 33 917 | 10/1993 | ........... H04N/1/10 |
| DE | 42 17 201 | 11/1993 | ........... G03B/27/62 |
| DE | 195 27 381 | 1/1997 | ............ H04N/1/04 |
| DE | 196 42 902 | 5/1997 | ............ H04N/1/04 |
| DE | 197 29 142 | 12/1998 | ........... H04N/1/10 |
| EP | 0 580 129 | 1/1994 | ........... H04N/1/46 |
| EP | 0 777 373 | 6/1997 | ............ H04N/1/04 |
| JP | 2-159889 | 6/1990 | .......... H04N/5/253 |

OTHER PUBLICATIONS

Patent Abstracts of Japan, Publication No. 03–202840 published Sep. 4, 1991.
Patent Abstracts of Japan, Publication No. 59–071041 published Apr. 21, 1984.

Primary Examiner—Jerome Grant, II
(74) Attorney, Agent, or Firm—Collard & Roe, P.C.

(57) ABSTRACT

The invention relates to a method and device used for the digital detection of transparent and opaque documents, comprising a CCD pick-up element, a document holder, an illuminating device and elements for covering the edges (masking unit) of the documents. The method comprises the following steps: a) placing the document on the document holder; b) determining the size of the document; c) automatically adjusting a zoom objective, assigned to the scanner, in relation to the document; d) automatically adjusting the masking to the document size; e) beginning the exposure process; f) automatically adjusting the illumination by determining the dynamic range of the image intensity; g) exposing the CCD chip in the camera (one shot); h) memorizing the digitized data in a PC memory; i) further processing the memorized data in the PC or in an external data processing installation.

13 Claims, 2 Drawing Sheets

METHOD AND DEVICE FOR THE DIGITAL DETECTION OF TRANSPARENT AND OPAQUE DOCUMENTS

The invention relates to a method and to a device for the digital detection of both transparent and opaque documents, with a CCD pick-up element, a document holder, an illuminating device, as well as elements (masking unit) for covering the edges of the documents.

A device of the type specified above is known from DE-OS 42 17 210.

Said device is employed for the digital detection of X-ray pictures and has an image pick-up element designed as a CCD-line. Said pick-up element is employed in the form of commercially available hand-held scanner picking up reflected light, or as a flat-bed scanner—which is commercially available as well—with a stepping motor for moving the image pick-up element.

A hand-held 256-grey tone scanner with a resolution of 400 dpi is preferably employed.

However, the pick-up process takes a very long time because the lines are picked up one by one, so that the achievable throughput rate is low, on the one hand. On the other hand, precautionary measures requiring much expenditure have to be implemented for keeping the illumination required for the pick-up proce-s constant.

Furthermore, only a few present document sizes can be processed by means of the known device. For other document sizes, provision is made for placing opaque screening strips on the document for covering the edges of the latter. This has an additional negative effect on the handling of the known device and further increases the expenditure in terms of time.

In view of the fact that predominantly analog X-ray pictures will be produced in the field of radiology over the next 10 to 15 years, which have to be digitized so that they can be optimally filed, processed further and used without problems, for example in the field of tolemedicine, excessive demands are made upon the known device for handling said tasks in a satisfactory manner. Furthermore, distinct losses ensue in this connection of the image quality versus analog images.

Therefore, the invention is based on the problem of designing a method and a device of the type specified above in such a way that both can be controlled in a simple and quick manner, on the one hand, and that documents of any type and size can be reproduced without any loss of quality, on the other.

The invention solves said problem with respect to the method according to the characterizing part of claim 1 by the following process steps:

(a) Placement of the document on the document holder.
(b) Determination of the size of the document.
(c) Automatic adjustment of the zoom lens to the document.
(d) Automatic adaptation of the masking unit to the size of the document.
(e) Start-up of the exposure process.
(f) Automatic adjustment of the illumination by determining the dynamic range of the image intensity.
(g) Exposure of the CCD-chip in the camera (one shot).
(h) Reading of the digitized data into the memory of the PC.
(i) Further processing of the stored data in the PC or on external data processing equipment.

Furthermore, the invention solves said problem according to the characterizing part of claim 2 in that the pick-up element is a CCD-camera, which is equipped with a motor-driven zoom lens with automatic focusing; that the masking unit is arranged below the document holder between the latter and the camera, said masking unit consisting of four opaque roller blinds with motor-driven adjustment, each two of which opposing one another are arranged in such a way that they can be synchronously adjusted relative to each other; and that the drive of the zoom lens and the drive of the masking unit are controllable in coordination with each other via a software.

In the aforementioned DE-OS 42 17 201, reference is already made to the use of the CCD-cameras with a flat CCD-sensor, in connection with which the image to be detected is read into the CCD-chip in the course of one single exposure process.

However, such a camera is said to have various drawbacks such as, for example the occurrence of edge distortions, which are said to lead falsification of the reproduced image, as well as the alleged necessity of extensive adjustment work.

Said prejudices are overcome by the design of the device as defined by the invention.

The device as defined by the invention is not suitable only for digitalizing analog X-ray pictures of technical or medical origin or other transparent documents to be processed by the transillumination method, but also for detecting other documents by reflected light.

The document is picked up the CCD-camera equipped with the self-focusing zoom lens in one single exposure process, whereby the control of the camera, the selection of the cutout and sharp focusing take place fully automatically, or via a user panel associated with the device.

In particular the enlargement of the motorized zoom lens located in front of the CCD-converter is controlled by the size of the image to be digitized, because the sensitive surface area of the CCD-converter can be optimally exploited in this way.

Said adaptation is realized by an allocation table stored in the form of data in a PC, said table containing the function of the size of the image and of the position of the zoom lens. In this connection, the geometric dimensions of the image to be digitized can be either preset manually (via a user panel), preferably graduated, or automatically recognized, for example by means of known methods of image processing.

Subsequently, the process of the zoom lens takes place successively according to the table described above, by means of a preferably voltage-controlled interface in the PC.

The adjustment of the masking unit is connected with the coordination of the position of the zoom lens and the detection of the size of the image. Said masking unit serves the purpose of shielding the light which, with documents which are smaller than the dimensions of the document holder, would otherwise radiate past the document, so that no undesirable light can incide in the optics of the camera.

According to the invention, the adjustment of the masking unit may take place semi- or fully automatically.

With semiautomatic masking, the roller shades of the masking unit are selected for the required adjustment to document sizes—which were previously defined in a fixed manner—by means of keys via the user panel. The control takes place either directly from the panel or via the PC.

With fully automatic masking, the camera recognizes the document size by means of an installed still-video function, in connection with several images are picked up per second with reduced resolution, and controls the masking roller shades upon such recognition to the respective size of the document to be picked up.

The masking unit consists of four roller shades, which are arranged and coupled in pairs opposing each other, so that roller shades opposing one another move symmetric to the center of the image. In this way, the document is always exactly placed over the optics of the camera. So that centric placement of the document with respect to the optical axis of the pick-up optics is secured, a positioning aid (e.g. in the form of a preferably optically projected diagonal cross on the document holder) is applied with the illumination cover open.

Furthermore, it is possible by means of the still-video function to determine documents cutouts that can be selected in any desired way. After such selection has been completed, said document cutouts are positioned in such a way that the cutout is exactly disposed above the camera optics.

The device as defined by the invention is advantageously equipped with both a transillumination and a reflected illumination unit. The transillumination unit forms a light cover and radiates through the image to be digitized (for example X-ray film) from behind. The light source as such consists of, for example at least four powerful flash tubes, their individual power being variable and adjustable from about 120 watts to about 240 watts. The arrangement of said four tubes assures absolutely uniform transillumination of the documents, so that no scatter will occur in the conduction of the light.

The illumination is controlled with the help of the determination of the dynamic range of the image intensity with the installed still-video function and a control algorithm implemented in the software, or through internal measurement.

The CCD-camera as the center piece of the device has a CCD-chip, which has a minimum size of 1 K/1 K and an s/w chip with a data depth of at least 12 bit. The data are picked up and evaluated via a software control. Said software assumes functions such as contrast control as well as recognition of the density of the document. In this way, it is assured that the reproduction does not have any shift of the grey shades in view of the original, and that no falsification occurs.

For digitizing opaque documents, the device has an illumination device approximately mounted in the plane of the camera, which illuminates the document from below through the masking unit. For this purpose, provision is made according to the invention that a roller shade made of light-absorbing material, whose surface facing the camera is blackened, is pulled over the entire illumination area of the transillumination unit in order to exclude interfering reflections. The roller shade is motor-driven and actuated, for example via the user panel.

The computer responsible for controlling the overall device and for storing and further processing the digital data collected is a PC, which is integrated in the device. Said PC, furthermore, is connectable to external data processing equipment.

However, the device also may operate in a self-supporting manner if the PC has a mass storage unit in which large amounts of data can be stored on site.

The device offers the possibility of data input. The data (for example patient-related data) can be stored in addition to the digitized image. The data entered can be input manually in the short form and allocated to an already existing master file of a data base that exists independently of the device (security compensation).

The unflawed functioning of the device (e.g. the condition of the illumination device and the correct adjustment of the optical components) can be controlled both locally on the device and via remote polling with the help of the reproduction of standard documents and a successive comparison with the fixed to the expected.

The overall device is accommodated in a housing, in connection with which the transillumination unit forms a cover which can be folded onto the document holder. The housing is a frame-type construction made from square sections. Their side walls are secured by means of screws or other service- and maintenance-friendly fasteners and can be removed at any time, so that the interior of the device and its components such as the masking unit, the CCD camera and the computer are easily accessible. So as to facilitate servicing of the device even further, the reflected-light unit, the transillumination unit, the camera, and computer and the masking unit are structured as modules that can be replaced without any problem.

The software of the device handles the following tasks: First, the transmission of data between the PC and the camera. Second, control of image enlargements by displacing the motor-driven zoom lens with automatic focusing. Third, representation and processing of the image data.

The transmission of data and information from the digital camera to the PC is realized via an SCSI-interface, or preferably via a PCI-interface. The transmission of information from the PC to the camera includes selection of the exposure time and fixation of the start of image pick-up in terms of time. The data transmission includes reading of the digitized image data of the camera into the operating memory of the PC.

With respect to intensity, the image data transmitted from the camera to the PC have a dynamic range of at least 12 bit (or 4096 grey levels), as already described above. For display on the monitor of the PC it is necessary to select the dynamic range of the image to be represented. This is accomplished by means of usually applied software methods such as grey shade spreading etc. The image data can be stored by means of the software both in unreduced intensity dynamics and reduced dynamics (e.g. as eight-bit data), using commercially available image file formats, preferably the TIF-format.

Reproductions of colored documents can be realized in the transillumination or reflected light either with a color-sensitive CCD-chip or a color filter wheel. Automatic calibration of the documents is supplemented by using a color wedge in the measuring range. The software is expanded by this control of said function.

The device as defined by the invention is comparable with respect to handling to a normal copier, which makes the application of the device extremely user-friendly.

The invention is explained and represented in greater detail in the following with the help of drawings, in which:

FIG. 1 shows in a schematized form a device for the digital detection of both transparent and opaque documents such as X-ray pictures, drawings, maps, text documents, said device generally being denoted by reference numeral 1.

Figure 1:
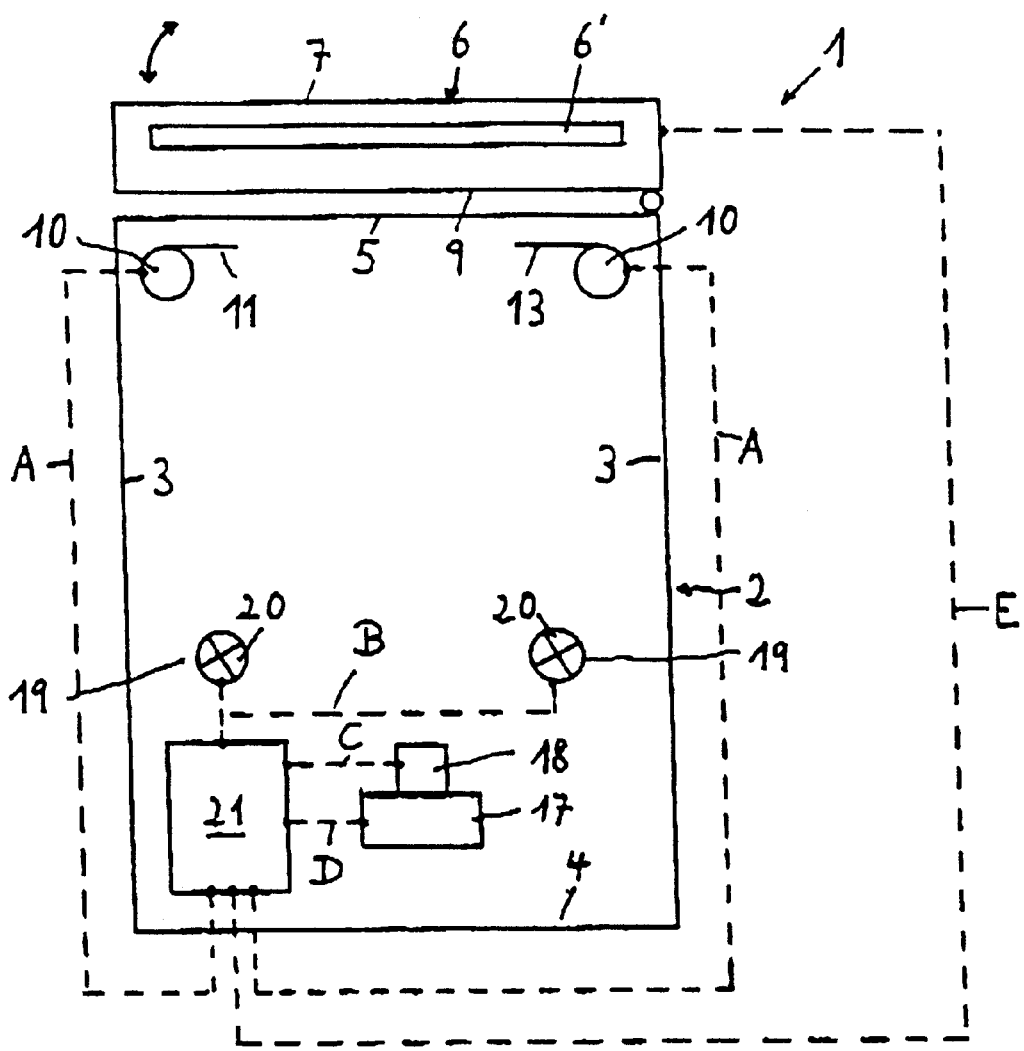
FIG. 1 shows the basic structure of the digitizing device.

Said device consists of a housing 2, which is structured from a frame construction with wall parts 3, which can be screwed on, and with a bottom part 4. The top termination is formed by a document holder 5 which substantially consists of a glass plate. Document holder 5 is covered by a transluminating device 6, which is accommodated in a flat, box-like cover 7, which is connected with housing 2 via a binge 8. Four flash tubes 6' are arranged in cover 7 in such a way that the light is distributed evenly. The distribution of the light is enhanced further by a frosted glass plate 9, which terminates the cover downwardly.

A roller shade, which can be wound on a shaft, is arranged (but not shown in the drawing) below said frosted glass plate 9. Said roller shade is unwound for reflected-light pick-ups and covers the entire frosted glass pane 9.

A masking unit generally denoted by reference numeral 10 is arranged in housing 2 below document holder 5.

Figure 2:
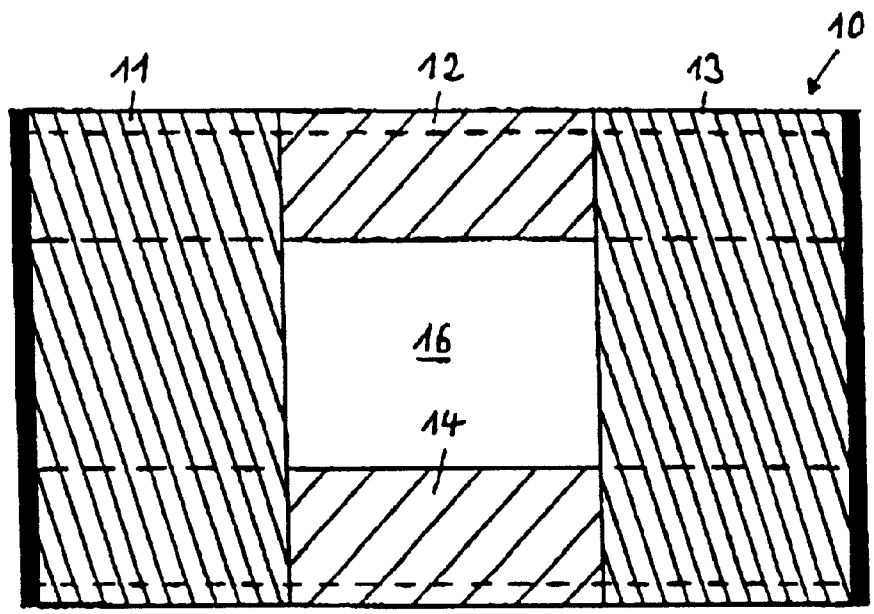
FIG. 2 is a top view of the masking unit.
Figure 3:
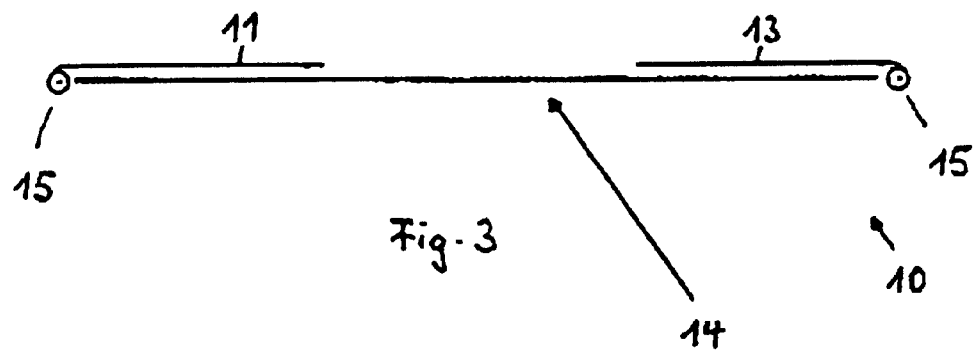
FIG. 3 shows a side view of the masking unit according to FIG. 2.

As more clearly shown in FIG. 2, said masking unit consists of four roller shades 11, 12, 13, 14, whereby the two two roller shades 11, 13, and the two roller shades 12, 14 are arranged in pairs opposing each other on the respective shafts 15. For enlarging or reducing cutout 16, the two pairs of roller shades opposing each other are synchronously displaced against each other. This is accomplished by means of a serve-motor, which acts on the individual shafts 15 via suitable gearings.

A CCD-camera 17 is arranged in the lower region of housing 2 in the center. Said camera is equipped with a self-focusing zoom lens 18. In the plane of the camera or slightly above the latter, provision is made for an illuminating light unit 19, which consists of a plurality of lamps 20.

Finally, a PC 21 is arranged in housing 2. Said PC is connected to masking unit 10 via a control line A, to illuminating unit 19 via a line B, to zoom lens 18 via a control line C, to camera 17 via a data line D, and to transillumination unit 6 via a control line E.

Not shown is a connection for connecting PC 21 to an external data processing installation.

A user panel (also not shown) is available for operating and controlling device 1.

PC 21 operates with a suitable software, via which the adjustment of camera 17 or zoom lens 18 is controlled in association with illuminating device 6, 19 to be put into operation, on the one hand, and, on the other hand, the adjustment of masking unit 10 and the data transport between the camera and the PC, as well as between the PC and the camera.

The mode of operation of device 1 is explained by way of example in the following on an X-ray picture to be digitized.

The transparent document is placed on document holder 5 and cover 7 with transilluminating unit 6 is folded over the document. The digitizing process is now started via the user panel.

In order to optimally exploit the sensitive surface of the CCD-converter, the optical enlargement is adapted to the dimensions of the document by displacing the motorized zoom lens 18. Such adaptation is accomplished by means of an allocation chart stored in the form of data in the PC, said chart containing the dependence on the image size and on the position of zoom lens 18. The geometric measures of the image to be digitized can be either preset in this connection manually, preferably graduated, or automatically recognized, for example by methods of image processing. Thereafter, the zoom lens is successively displaced according to the above-described chart by means of a preferably voltage-controlled interface in PC 21. Masking unit 10 is put into operation simultaneously. With semiautomatic masking, roller shades 11 to 14 are dialed by means of key selection via the user panel for their required adjustment to previously defined and fixed document sizes, and controlled in this connection either directly from the panel or via the PC 21.

With fully automatic masking, the camera recognizes the document size by means of an installed still-video function and, upon such recognition, displaces roller shades 11 to 14, adapting the latter to the given size of the document.

The data read into the CCD-chip of camera 17 are transmitted via data line D to the memory of PC 21. Pick-up of the data and the evaluation take place via a software control. Said software control also assumes functions such as contrast control as well as detection of the density of the document.

The procedure employed in the digitalization of opaque documents is analogous. Only transilluminating unit 6 is shut off in this procedure, and reflected-light illuminating unit 19 is switched on. In this process, the roller shade arranged below transilluminating unit 6 is pulled over the entire light outlet surface of transilluminating unit 6.

What is claimed is:

1. The device for the digital detection of both transparent and opaque documents, with a CCD pick-up element, a document holder, an illuminating device, and with elements for covering the edges of the documents, characterized in that the pick-up element is a CCD-camera equipped with a motor-driven zoom lens with automatic focusing; that the masking unit is arranged below the document holder between the document holder and the camera, said masking unit consisting of four motor-adjustable opaque roller shades, said roller shades being arranged in pairs opposing each other and being synchronously adjustable relative to one another; and that the drive of the zoom lens and the drive of the masking unit are controllable in coordination with each other via a software.

2. The device according to claim 1, characterized in that a PC processing the software is connected via a data and control line to the camera and by means of control lines to the illuminating device, the drive of the masking unit and to the motor of the zoom lens.

3. The device according to claim 2, characterized in that the PC and the camera and the masking unit and the document holder are jointly integrated in a housing.

4. The device according to claim 1, characterized in that the illuminating device consists of a transillumination unit arranged above the document holder.

5. The device according to claim 4, characterized in that the transilluminating unit is arranged in a cover foldably articulated on the housing and covering the document holder.

6. The device according to claim 1, characterized in that the illuminating device additionally consists of a lamp system arranged below the masking unit in the housing in about the plane of the camera.

7. The device according to claim 1, characterized in that the power of the lamps of the illuminating device is variably adjustable.

8. The device according to claim 4, characterized in that a light-absorbing element at least covering the cutout to be detected by the camera is inserted between the transilluminating unit and the document holder.

9. The device according to claim 8, characterized in that the light-absorbing element is a motor-driven roller shade, the surface of which facing the camera is blackened.

10. The device according to claim 1, characterized in that the CCD-chip in the camera has a data depth of >12 bit conforming to 4096 grey levels, and a minimum size of 1 K/1 K.

11. The device according to claim 1, characterized in that provision is made for a voltage-controlled interface in the PC for driving the zoom lens.

12. The device according to claim 1, characterized in that the PC, the masking unit and the illuminating device are designed as modules.

13. A method for the digital detection of both transparent and opaque documents with a CCD-recording element equipped with a zoom lens; a document holder; an illuminating device; a masking unit comprising elements for covering the edges of the documents; and an element for determining the size of the document, which comprises the following steps:

a) placing the document on the document holder;

b) determining the size of the document by means of the CCD-recording element, the CCD-recording element operating in a still-video function wherein a plurality of images of reduced resolution are recorded per second;

c) automatically adjusting the zoom lens associated with the CCD-recording element to the document;

d) using the still-video function to automatically adjust the masking by the masking unit to the size of the document;

e) starting the exposure process and using the still-video function to determine the dynamic range of the image intensity to control the illumination of the exposure process;

f) exposing the CCD-chip of the recording element to generate digitized data of an individual image;

g) reading the digital data into the memory of a PC that controls via software both the recording element and the illumination device, as well as the drive of the masking unit and the motor of the zoom lens; and h) further processing the stored data in the PC or in external data processing equipment.

* * * * *